(12) United States Patent
Bunker (10) Patent No.: US 8,974,859 B2
(45) Date of Patent: Mar. 10, 2015

(54) MICRO-CHANNEL COATING DEPOSITION SYSTEM AND METHOD FOR USING THE SAME

(71) Applicant: General Electric Company, Schenectady, NY (US)

(72) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 373 days.

(21) Appl. No.: 13/627,158

(22) Filed: Sep. 26, 2012

(65) Prior Publication Data

US 2014/0220253 A1    Aug. 7, 2014

(51) Int. Cl.
| | |
|---|---|
| *C23C 4/12* | (2006.01) |
| *C23C 4/00* | (2006.01) |
| *B05D 7/22* | (2006.01) |
| *B05D 3/00* | (2006.01) |
| *F01D 5/18* | (2006.01) |
| *F01D 5/28* | (2006.01) |

(52) U.S. Cl.
CPC . *C23C 4/005* (2013.01); *B05D 7/22* (2013.01); *B05D 3/00* (2013.01); *F01D 5/18* (2013.01); *F01D 5/28* (2013.01); *F01D 5/187* (2013.01); *F01D 5/288* (2013.01); *C23C 4/124* (2013.01); *F05D 2260/204* (2013.01); *F05D 2230/31* (2013.01)
USPC ........... 427/282; 427/259; 427/258; 427/261; 427/287; 118/58; 118/62; 118/63; 118/68; 416/223 R; 416/231 R (58) Field of Classification Search
None
See application file for complete search history.

(56) References Cited

U.S. PATENT DOCUMENTS

| | | | |
|---|---|---|---|
| 4,487,550 | A | 12/1984 | Horvath et al. |
| 4,893,987 | A | 1/1990 | Lee et al. |
| 5,564,902 | A | 10/1996 | Tomita |

(Continued)

FOREIGN PATENT DOCUMENTS

EP    1387040 B1    4/2004

OTHER PUBLICATIONS

Bellino, Mark Carmine et al.; "Pressure Masking Systems and Methods for Using the Same"; Pending U.S. Appl. No. 13/339,449, filed Dec. 29, 2011; 19 pages.

(Continued)

*Primary Examiner* — Michael Cleveland
*Assistant Examiner* — Lisha Jiang
(74) *Attorney, Agent, or Firm* — Ann M. Agosti (57) ABSTRACT

Methods of pressure coating a target surface of an article comprising one or more grooves formed in an outer surface of an article include fluidly connecting a pressure masker comprising a pressurized masking fluid to one or more coolant supply holes on a first side of the article. The one or more coolant supply holes in fluidic communication with the one or more grooves. Passing the pressurized masking fluid through the one or more grooves from the first side to a second side comprising the target surface at a pressure less than the coating pressure of the coating material, and, coating the target surface with the coating material to allow the coating material to bridge over the one or more grooves and form one or more micro-channels. The pressurized masking fluid passing through the one or more grooves prevents the coating material from permanently altering a cross sectional area of the one or more grooves along its length.

10 Claims, 6 Drawing Sheets

(56) References Cited

U.S. PATENT DOCUMENTS

| | | | |
|---|---|---|---|
| 5,626,462 | A | 5/1997 | Jackson et al. |
| 5,640,767 | A | 6/1997 | Jackson et al. |
| 5,660,523 | A | 8/1997 | Lee |
| 5,875,549 | A | 3/1999 | McKinley |
| 6,059,530 | A | 5/2000 | Lee |
| 6,086,328 | A | 7/2000 | Lee |
| 6,164,914 | A | 12/2000 | Correia et al. |
| 6,190,129 | B1 | 2/2001 | Mayer et al. |
| 6,214,248 | B1 | 4/2001 | Browning et al. |
| 6,231,307 | B1 | 5/2001 | Correia |
| 6,234,755 | B1 | 5/2001 | Bunker et al. |
| 6,321,449 | B2 | 11/2001 | Zhao et al. |
| 6,368,060 | B1 | 4/2002 | Fehrenbach et al. |
| 6,383,602 | B1 | 5/2002 | Fric et al. |
| 6,405,435 | B1 | 6/2002 | Konter et al. |
| 6,412,541 | B2 | 7/2002 | Roesler et al. |
| 6,427,327 | B1 | 8/2002 | Bunker |
| 6,551,061 | B2 | 4/2003 | Darolia et al. |
| 6,582,194 | B1 | 6/2003 | Birkner et al. |
| 6,602,053 | B2 | 8/2003 | Subramanian et al. |
| 6,617,003 | B1 | 9/2003 | Lee et al. |
| 6,878,046 | B2 | 4/2005 | Publ et al. |
| 6,905,302 | B2 | 6/2005 | Lee et al. |
| 6,921,014 | B2 | 7/2005 | Hasz et al. |
| 7,014,923 | B2 | 3/2006 | Schnell et al. |
| 7,094,475 | B2 | 8/2006 | Schnell et al. |
| 7,186,167 | B2 | 3/2007 | Joslin |
| 7,192,622 | B2 | 3/2007 | Fernihough et al. |
| 7,216,428 | B2 | 5/2007 | Memmen et al. |
| 7,302,990 | B2 | 12/2007 | Bunker et al. |
| 7,622,160 | B2 | 11/2009 | Gupta et al. |
| 7,744,348 | B2 | 6/2010 | Bezencon et al. |
| 7,766,617 | B1 | 8/2010 | Liang |
| 7,775,768 | B2 | 8/2010 | Devore et al. |
| 7,805,822 | B2 | 10/2010 | Hanley |
| 8,021,719 | B2 | 9/2011 | Graichen |
| 8,147,196 | B2 | 4/2012 | Campbell et al. |
| 2002/0141868 | A1 | 10/2002 | Lee et al. |
| 2002/0141869 | A1 | 10/2002 | Lee et al. |
| 2002/0182074 | A1 | 12/2002 | Bunker |
| 2002/0197160 | A1 | 12/2002 | Liang |
| 2003/0118444 | A1 | 6/2003 | Lee et al. |
| 2004/0096328 | A1 | 5/2004 | Soechting et al. |
| 2006/0153680 | A1 | 7/2006 | Liang |
| 2009/0226626 | A1* | 9/2009 | Gupta et al. .................. 427/448 |
| 2010/0080688 | A1 | 4/2010 | Bezencon et al. |
| 2012/0087802 | A1 | 4/2012 | von Niessen et al. |

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, and Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

Bunker, "Components With Microchannel Cooling", U.S. Appl. No. 13/448,469, filed Apr. 17, 2012.

Bunker, "Components With Microchannel Cooled Platforms and Fillets and Methods of Manufacture", U.S. Appl. No. 13/478,517, filed May 23, 2012.

Bunker et al., "Components With Cooling Channels and Methods of Manufacture", U.S. Appl. No. 13/595,120, filed Aug. 27, 2012.

Bancheri et al., "Method for Removal of Cores From Niobium-Based Part", U.S. Appl. No. 11/276,002, filed Feb. 9, 2006.

\* cited by examiner

MICRO-CHANNEL COATING DEPOSITION SYSTEM AND METHOD FOR USING THE SAME

BACKGROUND

The subject matter disclosed herein relates to coating deposition systems and, more specifically, to micro-channel coating deposition systems for coating articles with micro-cooling channels.

Gas turbine engines may be found in many applications, including industrial turbines, aero-derivative turbines, aircraft turbines, and the like. As an example, in a gas turbine engine for use in an aircraft, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures is a well-established art, and depends in part on supplying a cooling air to the outer surfaces of the metal parts through various methods. Typically, the hot gas path components are cooled by bleeding air from the compressor. The metal parts of these engines that are particularly subject to high temperatures, and thus require particular attention with respect to cooling, are the metal parts forming combustors and parts located aft of the combustor. It should be understood, that while metal parts are the convention at present, looking forward there may be ceramic parts and ceramic matrix composites, for example, that will require similar cooling.

Gas turbine engine cooling art is mature and includes numerous patents for various aspects of cooling circuits and features in the various hot gas path components. For example, in the aviation industry, the combustor typically includes radially outer and inner liners, which require cooling during operation. Industrial turbines more commonly may use can-annular combustor liners or dump combustors. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel surface cooling has the potential to significantly reduce cooling requirements by placing the cooling as close as possible to the heat zone, thus reducing the temperature difference between the hot side and cold side for a given heat transfer rate. Current techniques for forming microchannels typically require specialized techniques, such as, the use of sacrificial fillers, re-entrant grooves, angular deposition techniques, or the like. The use of sacrificial fillers keeps the coating from being deposited within the microchannels while supporting the coating during deposition. Subsequent to deposition of the coating system, the sacrificial filler (fugitive) material is removed. The filling of the channels with a fugitive material, and the later removal of that material presents potential problems for current micro-channel processing techniques. Removal of the sacrificial filler involves potentially damaging processes of leaching etching, or vaporization and typically requires long times. Residual filler material is also a concern. Other micro-channel coating deposition techniques include the fabrication of re-entrant grooves, in which a groove opening at the surface is small enough that the coating particles form a bridge with little or no deposition being deposited inside the groove, and thus within the formed micro-channel. In addition, angular deposition techniques have been utilized for the coating deposition thereby decreasing the line-of-sight into the channel opening. These techniques while accomplishing the deposition of the coating layer may inadvertently allow unwanted coating particles to be deposited into the micro-channels or channel openings.

Additional factors such as the size and shaping of a micro-channel at the coating deposition surface will influence the amount of coating deposited in the micro-channel even though the line-of-sight is present. In part this is due to the increased angle of deposition for any surfaces not normal to the spray direction, for example side walls of the micro-channel.

Accordingly, alternative coating deposition systems and methods would be welcomed in the art.

BRIEF DESCRIPTION

In one embodiment, disclosed is a method of pressure coating a target surface of an article to form one or more micro-channels. The method including fluidly coupling a pressure masker comprising a pressurized masking fluid to one or more coolant supply holes on a surface of an article and in fluidic communication with one or more grooves formed on an opposed surface thereof. Next, the method includes passing the pressurized masking fluid at a first pressure through the one or more coolant supply holes and the one or more grooves from the first side to a second side comprising the target surface. The target surface is then coated by projecting a coating material towards the target surface, wherein the pressurized masking fluid at a first pressure passing through the one or more grooves prevents the coating material from substantially altering a cross sectional area of the one or more coolant supply holes. Next, a pressurized masking fluid at a second pressure, equal to or greater than the first pressure, is passed through the one or more coolant supply holes and the one or more grooves and while continuing to coat the target surface, to allow the coating material to bridge the one or more grooves along a length of the one or more grooves toward an exit region and form the one or more micro-channels. The pressurized masking fluid is forced to flow down the length of the one or more grooves as the one or more grooves are bridged over by the coating material.

In another embodiment, a pressurized masking system for coating a target surface of an article comprising one or more grooves formed on an outer surface is disclosed. The pressurized masking system including a pressure masker that fluidly connects at a first side of the article to one or more coolant supply holes in fluidic communication with one or more grooves. The pressure masker passes a pressurized masking fluid at a variable pressure through the one or more grooves from the first side along a length of the one or more grooves toward an exit region at a second side, wherein the second side comprises the target surface. The system further including a part coater that projects a coating material towards the target surface. The pressurized masking fluid allows for the coating material to bridge the one or more grooves along a length of the one or more grooves toward an exit region to form one or more micro-channels and prevent the coating material from permanently altering a cross sectional area of the one or more grooves.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the embodiments defined by the claims. The following detailed description of the illustrative embodiments can be understood when read in conjunction with the following drawings, where like structure is indicated with like reference numerals and in which:

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Pressurized masking systems disclosed herein generally comprise a pressure masker and a part coater to coat the target surface of an article comprising one or more grooves, to form one or more micro-channels, also referred to herein as surface cooling channels. While the part coater projects coating material towards the target surface, pressurized masking fluid is fluidly connected to the grooves, via a coolant supply hole, and passed there through the grooves to permit the coating material to bridge the groove and form one or more micro-channels, also referred to herein as the surface cooling channels and prevent the permanent altering a cross sectional area of the surface cooling channels and a supply exit hole by the coating material. Pressurized masking systems, and methods of pressure coating a target surface of an article to form one or more surface cooling channels will be discussed in more detail herein.

Figure 1:
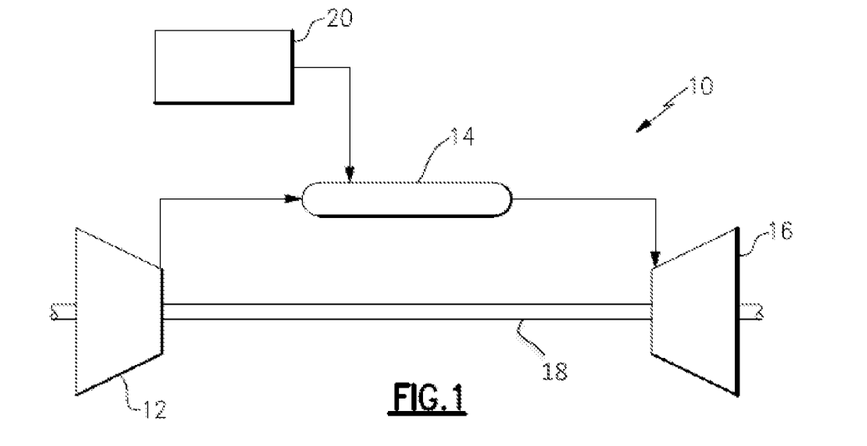
FIG. 1 is a schematic illustration of a gas turbine system, in accordance with one or more embodiments shown or described herein.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component of the present disclosure is not limited to the above examples, but may be any component that is at least partially exposed to a high temperature flow of gas. Further, it should be understood that the hot gas path component of the present disclosure is not limited to components in gas turbine systems 10, but may be any piece of machinery or component thereof that may be exposed to high temperature flows.

When a hot gas path component is exposed to a hot gas flow, the hot gas path component is heated by the hot gas flow and may reach a temperature at which the hot gas path component fails. Thus, in order to allow system 10 to operate with hot gas flow at a high temperature, increasing the efficiency and performance of the system 10, a cooling system for the hot gas path component is required.

In general, the cooling system of the present disclosure includes a series of small cooling channels, or microchannels, formed in the surface of the hot gas path component. The hot gas path component may include one or more grooves and a coating to bridge there over the grooves, and form the microchannels. A cooling fluid may be provided to the microchannels from a plenum, and the cooling fluid may flow through the micro-channels, cooling the coating.

Figure 2:
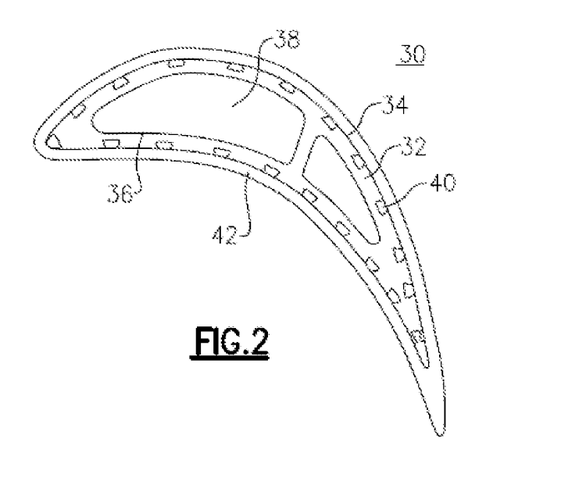
FIG. 2 is a schematic cross-section of an example airfoil configuration with surface cooling channels, in accordance with one or more embodiments shown or described herein.

Referring now to FIG. 2, illustrated is an example of a hot gas component 30 having an airfoil configuration. As indicated, the component 30 comprises a substrate 32 with an outer surface 34 and an inner surface 36. The inner surface 36 of the substrate 32 defines at least one hollow, interior space 38. In an alternate embodiment, in lieu of a hollow interior space, the hot gas component 30 may include a supply cavity. The outer surface 34 of the substrate 32 defines a number of surface cooling channels 40. Each of the surface cooling channels 40 extends at least partially along the outer surface 34 of the substrate 32. A coating 42 is disposed over at least a portion of the outer surface 34 of the substrate 32. In an embodiment, the hot gas component 30 may include multiple coatings 42, and the surface cooling channels 40 may be formed in the substrate 32, partially in the substrate 32 and the one or more of the coatings 42, or completely in the one or more coatings 42.

Figure 6:
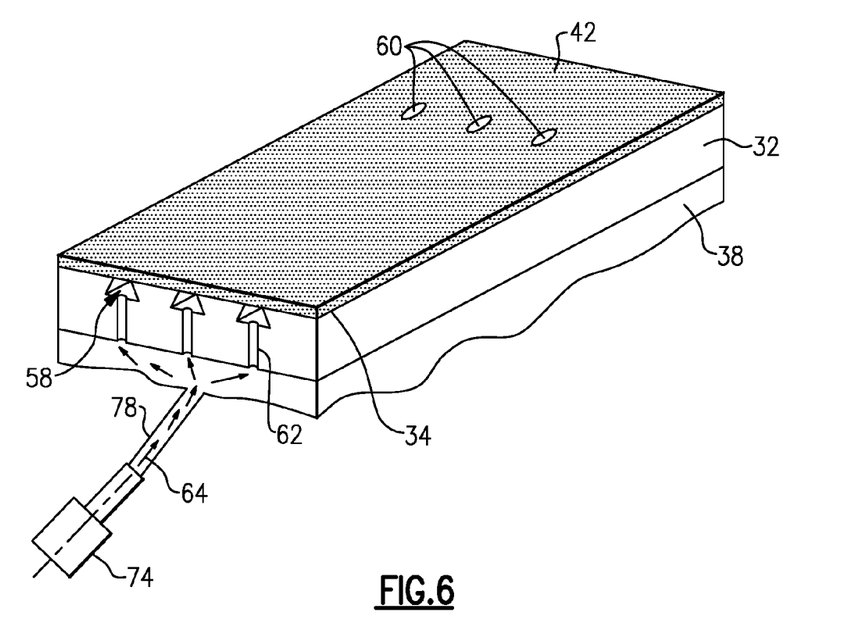
FIG. 6 is a perspective view of a pressure masking system in accordance with one or more embodiments shown or described herein.
Figure 7:
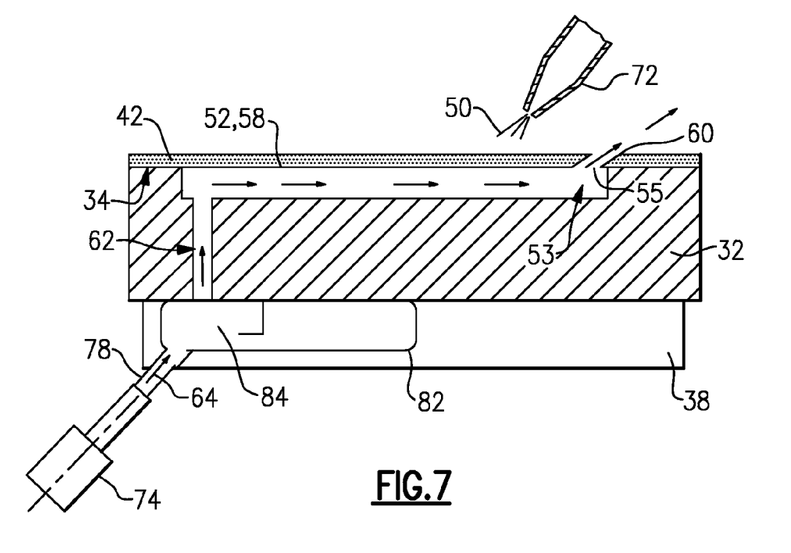
FIG. 7 is a schematic sectional view of a pressure masking system in accordance with one or more embodiments shown or described herein.
Figure 8:
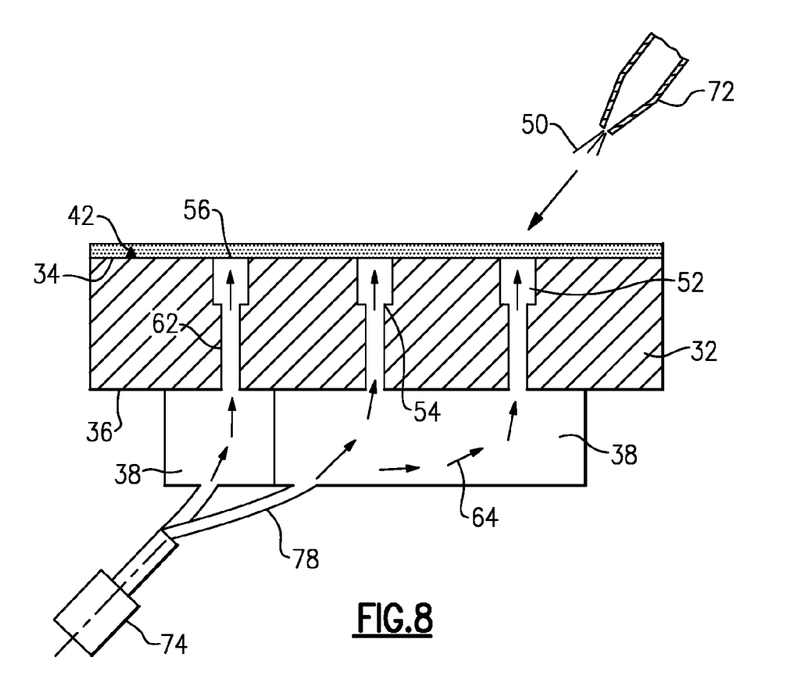
FIG. 8 is a schematic sectional view of a pressure masking system in accordance with one or more embodiments shown or described herein.

A pressurized masking system and method of fabricating a component 30 is described with reference to FIGS. 3-9. As indicated, for example, in FIGS. 4-9, the method includes forming one or more grooves 52 in the outer surface 34 of the substrate 32. For the illustrated examples, multiple grooves 52 are formed in the substrate 32. In an embodiment, as shown, for example, in FIG. 5, each of the grooves 52 may have a base 54 and a top 56, where the base 54 is wider than the top 56, such that each of the grooves 52 comprises a re-entrant shaped groove 58. In an embodiment, as shown, for example, in FIG. 8, each of the grooves 52 may have a base 54 and a top 56, where the base 54 and the top 56 have substantially equal widths. As illustrated in FIGS. 4, 6 and 7, the grooves 52 form one or more surface cooling channels 40 configured to convey fluid to a plurality of exiting film holes 60. It should be noted that although the exiting film holes are shown in FIG. 6 as being round, and at an angle relative to the coating 42 surface as shown in FIG. 7, these are non-limiting examples. The film holes may also be non-circular shaped holes and configured substantially perpendicular to, or at any angular instance, relative to the coating surface. In addition, in an embodiment, the film holes may not be formed as discrete features that match up one film hole per surface cooling channel. In such embodiment, one or more film trenches that connect more than one surface cooling channel exit together into a continuous exit feature may be formed.

As illustrated in FIGS. 3-8, and as previously indicated, one or more fluid entrants, or cooling supply holes, 62 is formed through the base 54 of a respective one of the grooves 52, to provide fluid communication between the grooves 52, and more particularly the final surface cooling channels 40, and the at least one hollow interior space(s) 38. The cooling supply holes 62 are typically circular or oval in cross-section and may be formed, for example using on or more of laser machining (laser drilling), abrasive liquid jet, electric discharge machining (EDM) and electron beam drilling The cooling supply holes 62 may be normal to the base 54 of the respective grooves 52 or may be drilled at angles in a range of 20-90 degrees relative to the base 54 of the groove 52.

Referring still to FIGS. 3-9, a pressurized masking system 70 is illustrated comprising a part coater 72 and a pressure masker 74 for coating an article 76 having one or more grooves 52 formed therein. The one or more grooves 52 are each in fluidic communication with one of the coolant supply holes 62 and an exit region 53, therefore allowing for a coolant to pass through the article 76 from a first side 44 to a second side 46 in the resulting surface cooling channel 40. As discussed above, the article 76 can comprise a variety of different parts such as a combustor liner or other component of a gas turbine engine. In some embodiments, the article 76 can comprise a turbine component such as a hot gas path component or a combustion component.

As illustrated in FIGS. 3-8, the second side 46 of the article 76 comprises a target surface 48 that is to be coated. The target surface 48 is coated prior to first use, during routine or repair maintenance, or as otherwise necessary depending on the life of the article 76 to form or maintain the surface cooling channels 40. As used herein, "coated" refers to at least partially applying a new material to a surface such as through the use of a thermal spray gun or the like as will become appreciated herein.

In some embodiments, such as when the article 76 comprises a metal hot gas path component, the target surface 48 of the article 76 may have a thermal barrier coating ("TBC") coated thereon prior to operation. The TBC can comprise one or more layers of metal and/or ceramic coating material applied to the target surface 48 of the article 76 to impede the transfer of heat from hot combustion gases to the article 76, thus insulating the component from the hot combustion gas. The presence of the TBC on the surface permits the combustion gas to be hotter than would otherwise be possible with the particular material and fabrication process of the component. Any suitable composition of TBC may be applied. For example, in some embodiments the TBC can comprise a bond layer of MCrAlY, wherein M is preferably Ni, Co, or a combination thereof, followed by a layer of yttria stabilized zirconia (YSZ).

Figure 3:
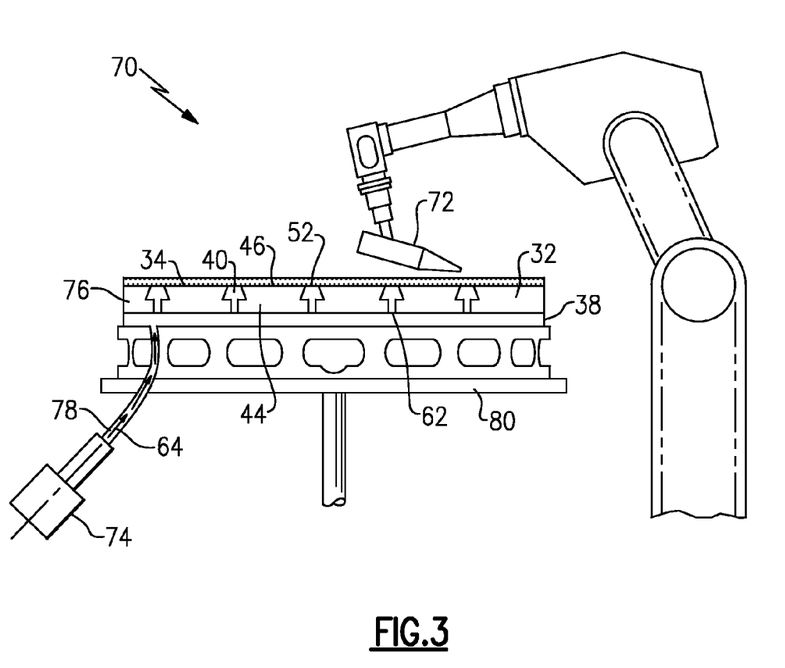
FIG. 3 is a schematic illustration of a pressure masking system in accordance with one or more embodiments shown or described herein.
Figure 4:
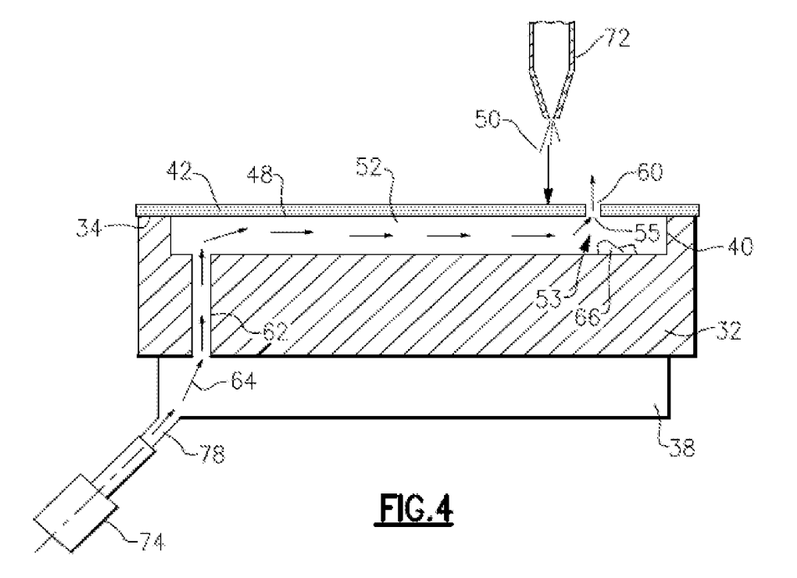
FIG. 4 is a schematic sectional view of a pressure masking system in accordance with one or more embodiments shown or described herein.
Figure 5:
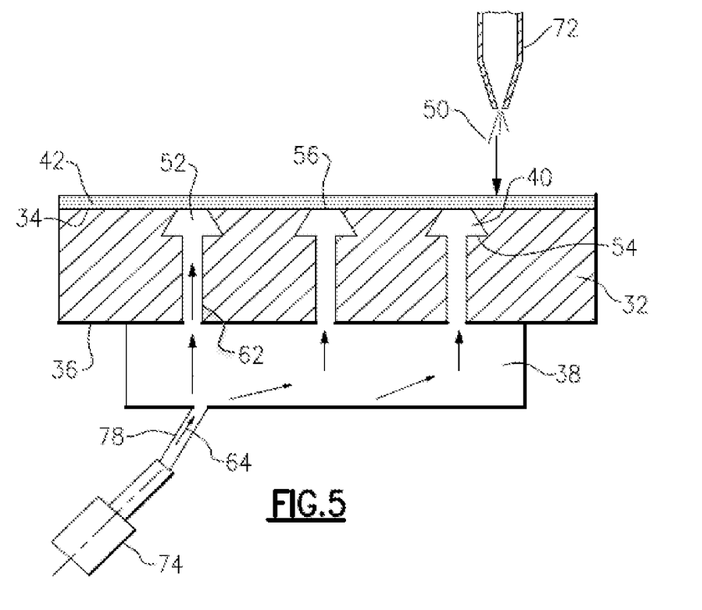
FIG. 5 is a schematic sectional view of a pressure masking system of FIG. 4 in accordance with one or more embodiments shown or described herein.

As best illustrated in FIG. 3, in some embodiments, the article 76 may be disposed on a support stand 80 prior to or during the pressure coating as will become appreciated herein. The support stand 80 may be stationary or mobile (e.g., rotatable) and position the article 76 relative to the part coater 72 and the pressure masker 74 when coating the target surface 48 of the article 76.

Still referring to FIGS. 3-8, the pressurized masking system 70 further comprises the part coater 72. The part coater 72 comprises any device that projects a coating material 50, to form the coating 42, towards the target surface 44 of the article 76.

The part coater 72 may be disposed at any position relative to the article 76 that allows for the coating of the target surface 44. For example, as illustrated in FIG. 3, in some embodiments the article 76 may be disposed on the support stand 80 adjacent the part coater 72. The support stand 80 may then be able to rotate or otherwise displace the article 76 with respect to the part coater 72 and/or the part coater 72 may be able to articulate with respect to the article 76. The part coater 72 may then be used to project the coating material 50 towards the target surface 44 of the article 76. However, as a result of coating material 50 being projected toward the target surface 44 of the article 76, some of the coating material 50 may enter one or more of the grooves 52, during fabrication of the surface cooling channels 40, from the second side 46 of the article 76. As such, some of the coating material 50 may potentially form obstructions 66 (FIG. 4) in the one or more surface cooling channels 40 if left unopposed.

The part coater 72 may be used for a variety of applications to coat the target surface 44 of the article 76. For example in some embodiments the part coater 72 may be used to coat the target surface 48 with a TBC as discussed above. In some embodiments, the part coater 72 may be used to apply a bond coat to the target surface 48 for the subsequent application of a TBC or other coating. In some embodiments, the part coater 72 may be used to apply a paint coat to the target surface 44. In some embodiments, the part coater 72 may be used to apply other coatings such as diffusion coatings, thermal barrier coating (TBC), dense vertically cracked (DVC) coatings, coatings formed by high velocity oxy-fuel (HVOF), or other adhesive bonding coatings. While specific embodiments have been presented herein, it should be appreciated that these are exemplary only and any other application of the part coater 72 as part of the pressurized masking system 70 may also be realized.

Referring still to FIGS. 4-8, the pressurized masking system 70 further comprises a pressure masker 74. The pressure masker 74 comprises a fluid connection 78 that fluidly connects a source of masking fluid (not shown) to at least one groove 52 of the article 76, via the cooling supply hole 62. As used herein, "fluid connection" refers to any type of connection or configuration that allows the pressurized masking fluid 64 to pass from the pressure masker 74 to the at least one groove 52 with negligent loss to the outside environment. The fluid connection 78 may comprise, for example, any form of conduit that directs the passage of the pressurized masking fluid 64 to the one or more groove 52. It should be appreciated that any configuration that provides a fluid connection 78 between the pressure masker 74 and at least one groove 52, via the cooling supply holes 62, may be realized. For example, as best illustrated in FIG. 4, in an embodiment the fluid connection 78 may comprise the at least one hollow, interior space 38 that serves as an internal passage of the article 76 that can receive pressurized masking fluid 64 from the pressure masker 74 and fluidly distribute it to at least one groove 52 of the article 76. The pressure masker 74 can thereby attach directly to the at least one hollow, interior space 38 and distribute the pressurized masking fluid 64 to a wide area about the article 76. Any cooling supply hole 62 within that area and in fluidic communication with that hollow, interior space 38 will thereby have pressurized masking fluid 64 fluidly pass there through. In an embodiment, the at least one hollow, interior space 38 has an entry point, such as a dovetail for a bucket component, and the fluid connection 78 would be made at that entry point to supply the pressurized masking fluid 64 to the entire hollow, interior space 38. In an embodiment, a fixture (not shown) may be built that attaches to this entry point in sealing engagement such that the flow of the pressurized masking fluid 64 can be measured, and its conditions (including, but not limited to, pressure and temperature) are known. In an alternate embodiment, the fluid connection 78 may be configured to connect directly to each of the cooling supply holes 62.

In another embodiment illustrated in FIG. 7, such as in an airfoil with exposed endwalls, the fluid connection 78 may comprise a multi-outlet manifold connection 82 comprising at least one internal passage 84 that can receive the pressurized masking fluid 64 from the pressure masker 74 and fluidly distribute it to one or more surface cooling channels 40 via the fluid entrants 62. The multi-outlet manifold connection 82 may attach directly to the first side 44 of the article 76 and distribute the pressurized masking fluid 64 to a wide area about the article 76 or to an exposed cavity (not shown) in the article 76. Any fluid entrants 62, and more particularly surface cooling channels 40, within that area will thereby have pressurized masking fluid 64 fluidly pass there through. In yet another embodiment illustrated in FIG. 8, the fluid connection 78 may comprise a plurality of connections leaving the pressure masker 74 that connects to a single or a plurality of coolant supply holes 62 via the at least one hollow, interior space 38. For example, the fluid connection 78 may comprise a plurality of channels of similar or dissimilar pressurized masking fluids 64 that connect to two or more coolant supply holes 62. Moreover, the plurality of channels may comprise different pressures, temperatures, directions or mixtures of pressurized masking fluids 64. It should be appreciated that any other configuration that provides a fluid connection 78 between the pressure masker 74 and one or more grooves 52, and resultant surface cooling channels 40, via the coolant supply holes 62 may alternatively or additionally be realized.

The pressurized masking fluid 64 may comprise any medium that can pass through the one or more grooves 52, that form the one or more surface cooling channels 40, with a positive energy and prevent the permanent altering of a cross sectional area of the at least one grooves 52 by the coating material 50 (or particulates thereof). As used herein, "prevent the permanent altering of a cross sectional area" (and variants thereof) refers to removing and/or preventing substantially all of the coating material 50 that may enter the one or more grooves 52 so that the cross sectional area of the resultant channel 40 is not substantially reduced by an obstruction 66 (FIG. 4) that becomes permanently adhered or increased due to erosion, deformation or the like. It should be appreciated that a thin coating of the interior walls directly proximate the second side 46 of the article 76 is not considered to permanently alter the cross sectional area of the one or more surface cooling channels 40 as any such reduction would be relatively minimal and not noticeably affect the flow of air through the one or more surface cooling channels 40 during operation. Examples of obstructions that would permanently alter the cross sectional area of the final one or more surface cooling channels 40 include, for example, large particulates lodged against a wall, a clumping of coating material 50 or the like. The pressurized masking fluid 64 may thereby comprise any material that can be forced through the one or more grooves 52 and resulting one or more surface cooling channels 40 at a masking pressure (described presently) to reduce or prevent potential obstructions 66 or any loosely bonded obstructions 66 of the coating material 50 that would alter the cross sectional area.

For example, in some embodiments, the pressurized masking fluid 64 may comprise a gas such as inert gas or nitrogen. In some embodiments, the pressurized masking fluid 64 may comprise water with or without abrasives distributed therein. While specific embodiments of pressurized masking fluid 64 and part coaters have been presented herein, it should be appreciated that additional and alternative pressurized masking fluids and part coaters may also be realized.

The pressurized masking fluid 64 may comprise a masking pressure that is greater than, equal to, or less than a coating pressure of the coating material 50, according to the stage in the process as described herein and so long as the pressurized masking fluid 64 has enough energy to remove potential obstructions 66 or loosely bonded obstructions 66 that may become permanently adhered from the one or more grooves 52, during fabrication of the one or more surface cooling channels 40. In an embodiment, the masking pressure may comprise a variable positive pressure such that the positive pressure progressively increases during the masking process and pushes the pressurized masking fluid 64 through a length of the one or more grooves 52 as it progresses down the one or more grooves 52. Likewise, the part coater 72 coats the target surface 44 of the article 76 by projecting coating material 50 towards the target surface 44. As a result of flow pattern distributions, some of the coating material 50 may enter the one or more grooves 52, prior to bridging over of the grooves 52 with the coating material 50, and form one or more obstructions 66. For example, the obstructions 66 may comprise a grouping of particulates from the coating material 50 that would decrease the cross sectional area of the one or more channels 40 and reduce the amount of air that could flow there through. However, to prevent the coating material 50, and more particularly the obstructions 66 from permanently obstructing the one or more surface cooling channels 40 (and altering its cross sectional area), the pressurized masking fluid 64 will provide a pressure during the bridging over process to assist with the bridging of the coating material 50, and more particularly provide support for the coating material 50. In addition the pressurized masking fluid 64 will contact any potential obstruction 66 and push it back down the length of the groove 52, and toward the exit region 53. The method as described herein, initially allows a thin amount of coating material 50 be deposited inside the grooves 52 and then to begin bridging over the grooves 52. At a point in time when the bridging of the grooves 52 is near completion, e.g. within 0.005" to 0.01" of being fully bridged, the pressurized masking fluid 64 will increasingly flow along the length of the groove 52. Eventually as the bridge is completely formed over the groove 52, the pressurized masking fluid 64 will all flow along the entire length of the groove 52 and toward the exit region 53. At the exit region 53, the pressurized masking fluid 64 may prevent any potential obstructions 66 from entering or being deposited in the one or more formed surface cooling channels 40 via the pressurized masking fluid 64 exiting the groove 52 at the exit region 53 on the second side 46 of the article 76.

In operation, the system is configured to deposit the coating material 50 along a length of each of the one or more grooves 52 commencing at a point substantially proximate the coolant supply hole 62 and progressing down the length of the groove 52, either continuously or discontinuously. As the coating material 50 begins to bridge over the groove 52, the surface cooling channels 40 are formed. At an onset of the process, the pressurized masking fluid 64 is supplied via the coolant supply hole 62 at a pressure sufficient to allow it to "weep out" of the coolant supply hole 62, thereby preventing any coating material 50 from depositing in the coolant supply hole 62 as the part coater 72 is substantially in alignment with the coolant supply hole 62. The pressurized masking fluid 64 applied at this first pressure, does not allow for a flow of the pressurized masking fluid 64 down the length of the associated groove 52, but will exit out the coolant supply hole 62 and into the surrounds.

As the deposited coating material 50 begins to bridge over the one or more grooves 52, the pressurized masking fluid 64 is forced to flow along the length of the one or more grooves 52 toward the exit region 53. During this phase, the pressurized masking fluid 64 is provided at a second pressure, equal to or greater than the first pressure, such that it supports the coating material 50 and does not prevent the bridging process of the coating material 50 over the one or more grooves 52. The passing of the pressurized masking fluid 64 at the second pressure will prevent any additional coating material 50 from depositing within the one or more grooves 52. It is important during the coating process that a coolant exit hole 55 has previously been formed at the exit region 53, such as a machined ramp in the surface transitioning from a groove depth to the outer surface 34.

As sufficient coating material 50 completes the bridging of the one or more grooves 52, and forms the one or more surface cooling channels 40, the pressurized masking fluid 64 will entirely flow down the length of the groove 52 toward the exit region 53 for the remainder of the coating deposition time, thereby preventing further coating material 50 from depositing in the exit region 53. At this stage in the process the flow rate of the pressurized masking fluid 64 may be at an increased rate and/or pressure to assure a coolant exit hole 55 at the exit region 53 is clear of any coating material 50. More particularly, in an optionally included step, the pressurized masking fluid 64 may be provided at a third pressure, equal to or greater than the second pressure, so as to flow along the length of the one or more grooves 52 toward the exit region 53 to maintain and assure the coolant exit hole 55 at the exit region 53 is enlarged and clear of any coating material 50.

Accordingly, the pressure masker 74 thereby passes the pressurized masking fluid 64 through the one or more grooves 52, via the fluidically communicating coolant supply hole 62, at a variable masking pressure from the first side 44 to the second side 46 (wherein the second side 46 comprises the target surface 48 of the article 76 that is to be coated). The one or more grooves 52 are coated during the process to the point the pressurized masking fluid 64 flows through the resultant channel and "masks" the exit at the exiting film hole 60.

Figure 9:
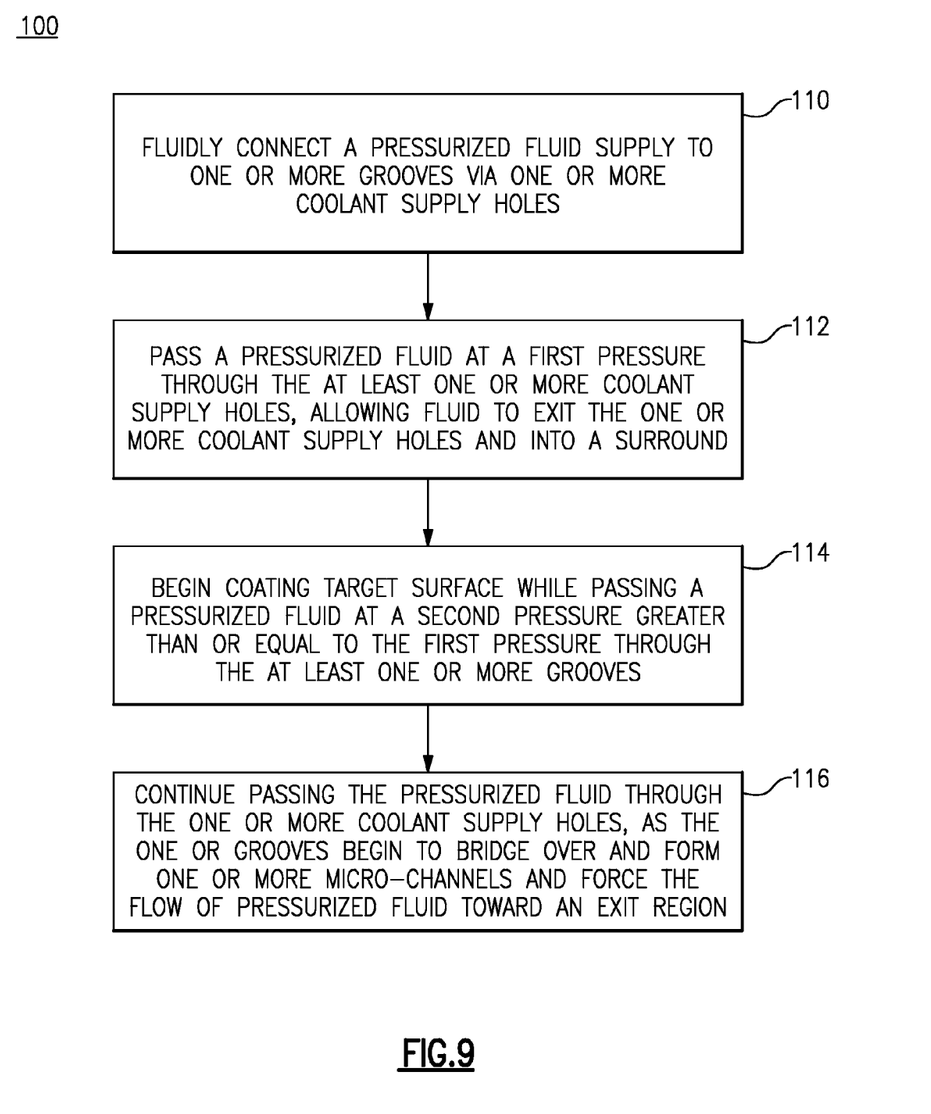
FIG. 9 is a block diagram of a method of pressure coating an article using a pressure masking system in accordance with one or more embodiments shown or described herein.

Referring more particularly to FIG. 9, a method 100 is illustrated for pressure coating a target surface 44 of an article 76 comprising one or more grooves 52. The method 100 first comprises fluidly connecting the pressure masker 74 to a first side 44 of at least one groove 52 of the article 76 via a coolant supply hole 62, in step 110. As discussed above, the fluid connection 78 may comprise a variety of configurations and may connect any type of pressure masker 74 to any number of grooves 52. The pressure masker 74 then passes the pressurized masking fluid 64 through the at least one coolant supply hole 62 at a first pressure, allowing the pressurized masking fluid 64 to exit the coolant supply hole 62 into the surrounds. Next, the part coater 72 begins to coat the target surface 44 on the second side 44 of the article 76 by projecting coating material 50 towards the target surface 44 in step 114. Simultaneously with the step of depositing the coating material 50, the pressurized masking fluid 64 is passed through the coolant supply hole 62 and into the one or more grooves 52 and toward and exit region 53 at a second pressure allowing for the coating material 50 to bridge over the one or more grooves 52 and form the one or more surface cooling channels 40, wherein the second pressure is equal to or greater than the first pressure. The process is continued in step 116, as the one or more grooves 52 are bridged over and the one or more surface cooling channels 40 form. The pressurized masking fluid 64 is forced to flow along a length of the one or more surface cooling channels 40 and out the exit region 53 at a cooling film exit 60.

It should be appreciated that passing pressurized masking fluid 64 through the at least one groove 52 and coating the target surface 44 in step 114 may start and end simultaneously in or with relative delay. As previously described, in some embodiments the pressurized masking fluid 64 is commenced in step 112 at a first pressure prior to the initiation of coating the target surface 44 in step 114. Such embodiments may prevent a buildup of obstructions 66 prior to activation of the pressure masker 74. In an embodiment, the pressurized masking fluid 64 continues to pass through the one or more formed surface cooling channels 40 in step 116 at a higher pressure after the article 76 is coated in step 114 and the one or more grooves 52 are bridged. Such step may help ensure any loosely bonded obstacles 66 remaining in the formed one or more surface cooling channels 40 after coating is complete in step 114 are still removed by the pressurized masking fluid 64.

It should now be appreciated that pressurized masking systems may be used to coat the target surface of an article, and more particularly to coat one or more grooves formed in a target surface and form one or more surface cooling channels, while preventing the permanent altering of a cross sectional area of the one or more grooves, resultant channels, and/or exit region. The use of a fluid connection between the pressure masker and the one or more grooves can prevent the need for physical masking barriers such as a fugitive filler material or the like potentially providing a more efficient coating system.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure n is not to be seen as limited by the foregoing description, but is only limited by the scope of the appended claims.

What is claimed is:

1. A method of pressure coating a target surface of an article to form one or more micro-channels, the method comprising:
   fluidly coupling a pressure maker comprising a pressurized masking fluid to one or more coolant supply holes that are on a first side of an article and are in fluidic communication with one or more grooves formed on an opposed second side of the article;
   passing the pressurized masking fluid at a first pressure through the one or more coolant supply holes and the one or more grooves from the first side to the second side, wherein the second side is comprised of the target surface;
   coating the target surface by projecting a coating material towards the target surface, wherein the pressurized masking fluid is passed through the one or more grooves at a first pressure to thereby prevent the coating material from substantially altering a cross sectional area of the one or more coolant supply holes; and
   while continuing to coat the target surface, passing the pressurized masking fluid at a second pressure, equal to or greater than the first pressure, through the one or more coolant supply holes and the one or more grooves and towards an exit region to thereby allow the coating material to bridge the one or more grooves along a length of the one or more grooves and form the one or more micro-channels, wherein the pressurized masking fluid is forced to flow down the length of the one or more grooves as the one or more grooves are bridged over by the coating material.

2. The method of claim 1, further including passing the pressurized masking fluid at a third pressure, equal to or greater than the second pressure, through the one or more micro-channels to maintain an enlarged coolant exit hole.

3. The method of claim 1, wherein the pressurized masking fluid comprises a gas.

4. The method of claim 3, wherein the gas comprises nitrogen.

5. The method of claim 1, wherein the pressurized masking fluid comprises a liquid.

6. The method of claim 1, wherein the coating material comprises MCrAlY, wherein M is Ni or Co.

7. The method of claim 1, wherein the coating material comprises yttria stabilized zirconia.

8. The method of claim 1, wherein a thermal spray gun projects the coating material to coat the target surface.

9. The method of claim 1, wherein the pressurized masking fluid continues to pass through the length of the one or more grooves after coating the target surface is complete to remove any loosely bonded obstructions that may be present.

10. The method of claim 1, wherein the first pressure at which the pressurized masking fluid passes through the one or more grooves is equal to or greater than a coating pressure of the coating material.

* * * * *